United States Patent [19]

Takasuka et al.

[11] Patent Number: 5,335,744
[45] Date of Patent: Aug. 9, 1994

[54] KNOCK CONTROL SYSTEM FOR AUTOMOBILE INTERNAL COMBUSTION ENGINE

[75] Inventors: Yoshitaka Takasuka; Yasuyuki Kimura; Akira Kato, all of Saitama, Japan

[73] Assignee: Honda Giken Kogyo Kabushiki Kaisha, Tokyo, Japan

[21] Appl. No.: 995,460

[22] Filed: Dec. 22, 1992

[30] Foreign Application Priority Data

Dec. 27, 1991 [JP] Japan .............. 3-113269[U]

[51] Int. Cl.$^5$ .................................. B60K 28/16
[52] U.S. Cl. ...................... 180/197; 364/426.03; 123/333; 123/344; 123/417
[58] Field of Search ............ 180/197; 364/426.03; 123/416, 417, 344, 333, 332

[56] References Cited

U.S. PATENT DOCUMENTS

| | | | |
|---|---|---|---|
| 4,951,773 | 8/1990 | Poirier et al. | 123/333 |
| 5,012,882 | 5/1991 | Oono et al. | 180/197 |
| 5,067,579 | 11/1991 | Kushi et al. | 180/197 |
| 5,224,004 | 6/1993 | Tamura et al. | 180/197 |
| 5,224,565 | 7/1993 | Tamura et al. | 180/197 |

FOREIGN PATENT DOCUMENTS 62-17665   4/1987  Japan .
62-237048 10/1987  Japan .

Primary Examiner—Margaret A. Focarino
Assistant Examiner—Kevin Hurley
Attorney, Agent, or Firm—Nikaido, Marmelstein, Murray & Oram

[57] ABSTRACT

A system for controlling combustion knock, if occurring, in an engine by suppressing it by retarding ignition timing. The engine is equipped with traction control for preventing the driven wheel of the vehicle on which the engine is mounted from slipping. In the system, if the traction control is in process, by leaning out a mixture to be supplied to the engine at a high engine speed region, the knock control is discontinued so as to prevent the exhaust gas temperature from rising excessively and so as not to degrade a catalyst installed in the exhaust system and exhaust emission. The knock control is suspended for a period even after the supply of the lean mixture has ceased.

10 Claims, 10 Drawing Sheets

KNOCK CONTROL SYSTEM FOR AUTOMOBILE INTERNAL COMBUSTION ENGINE

BACKGROUND OF THE INVENTION

This invention relates to a knock control system for an automobile internal combustion engine and more particularly to a knock control system for an automobile internal combustion engine equipped with a traction control system.

DESCRIPTION OF THE PRIOR ART

Recent years have seen increasing use of traction control for preventing a vehicle's driven wheel from spinning during drive-away or when accelerating so as to ensure safer and more comfortable vehicle operation. In traction control, if the driven wheel is detected to be slipping, the engine output torque is reduced in response to the extent of the slippage, by controlling spark advance of the engine, by leaning out the mixture to be supplied to the engine or by discontinuing the supply of fuel to the engine. Such a system is disclosed, for example, in Japanese Laid-Open Patent Publication No. 62(1987)-237,048.

Apart from the above, it is well known to control spark advance of the engine to suppress combustion knock, if occurred, as taught by Japanese Patent Publication 62(1987)-17,665, for example.

When a vehicle is installed with the traction control system while the engine mounted thereon is subject to the knock control, the engine output torque is often reduced by leaning out the mixture, say 17.0:1, if the extent of the driven wheel's slippage is not extensive, resulting in a rise in combustion temperature. At that instant, if ignition timing is retarded upon occurrence of combustion knock, the combustion lags behind so that the exhaust gas temperature will further rise. The exhaust gas at such a high temperature could degrade components such as catalysts installed in the exhaust system and affect exhaust gas emission. This is a particular problem during an engine's high speed running, since a combustion cycle, i.e., a TDC interval becomes shorter than at a low engine speed.

SUMMARY OF THE INVENTION

This invention was accomplished in view of the foregoing problem and has the object to provide a knock control system for an automobile internal combustion engine equipped with a traction control in which the exhaust gas temperature is prevented from rising excessively, whereby components in the exhaust system and exhaust gas emission are prevented from being degraded.

For achieving the object, the present invention is a system for controlling combustion knock which occurs in an internal combustion engine, including a knock sensor, a first device for detecting combustion knock occurs in the engine in response to an output signal of the knock sensor, a second device for carrying out knock control by adjusting ignition timing of the engine in the retard direction when combustion knock is detected to occur, a third device for detecting the slipping condition of a driven wheel of a vehicle on which the engine is mounted, a fourth device for carrying out a traction control to reduce the engine output torque in response to the detected slipping condition of the driven wheel at least through the supply of fuel to the engine, and a fifth device for discriminating if the traction control is in process. In the system, the second device discontinues the knock control if the traction control is found to be in process.

DETAILED DESCRIPTION OF THE PREFERRED EMBODIMENTS

The invention will now be explained with reference to specific embodiments.

Figure 1:
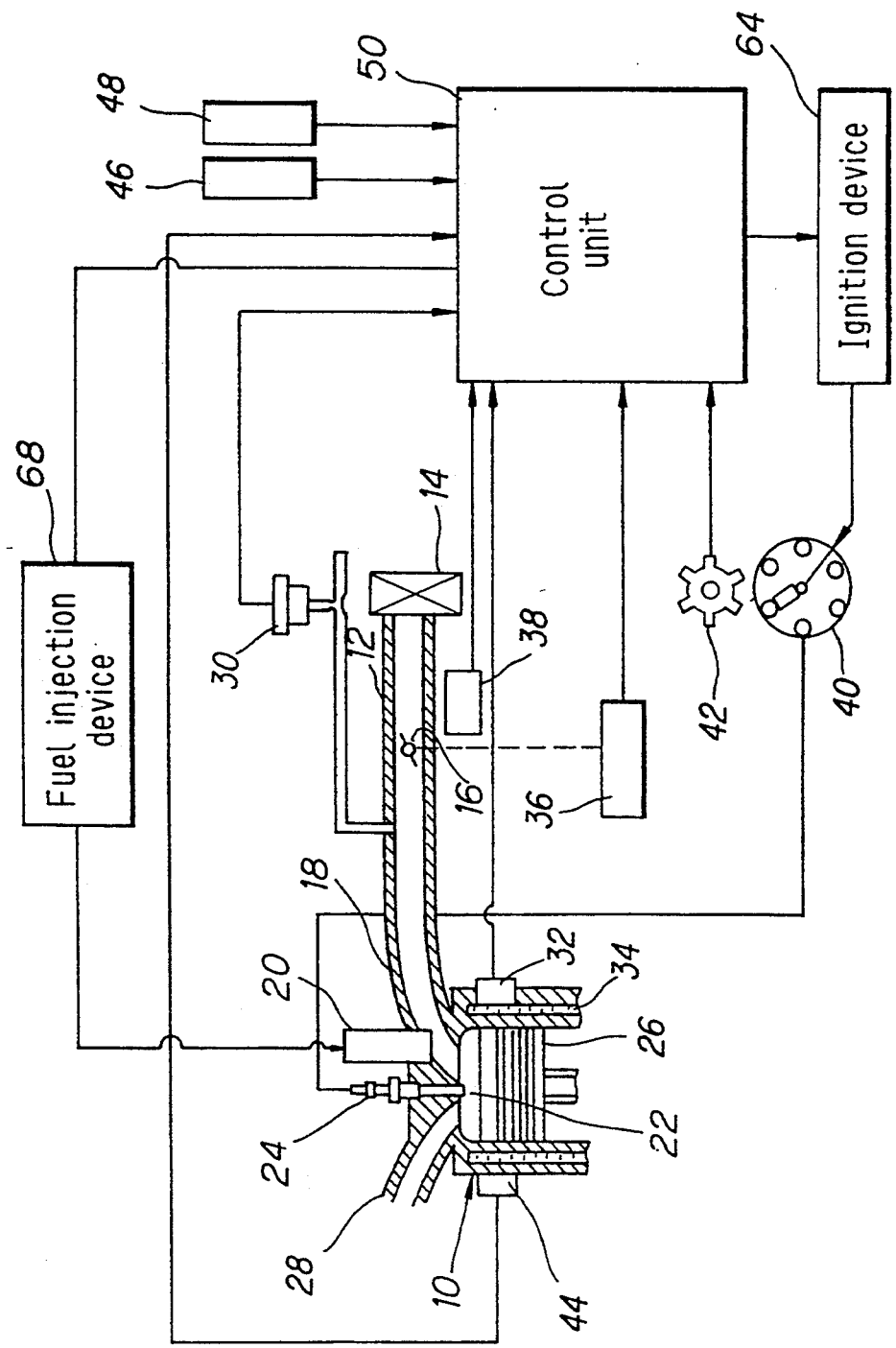
FIG. 1 is an overall schematic view showing a knock control system for an automobile internal combustion engine equipped with a traction control according to the invention.

FIG. 1 shows the overall arrangement of a knock control system for an automobile internal combustion engine. Reference numeral 10 in this figure designates an internal combustion engine having six cylinders. The engine 10 has an air intake path 12 and air drawn in through an air cleaner 14, mounted on the far end of the air intake path 12, has its flow rate controlled by a throttle valve 16 and is supplied to the first through sixth cylinders through an air intake manifold 18. More specifically, an injector 20 for injecting fuel is installed in the vicinity of an intake valve (not shown) of each cylinder and the injected fuel mixes with the intake air to form an air-fuel mixture that is introduced into each cylinder's chamber 22 and ignited there by a spark plug 24. The resulting combustion of the air-fuel mixture drives down a piston 26 (only one shown). The exhaust gas produced by the combustion is discharged through an exhaust valve (not shown) into an exhaust manifold 28, from where it passes through an exhaust pipe (not shown) to a catalytic converter (not shown) where it is removed of noxious components before being discharged to the exterior.

A pipe branches off from the air intake path 12 at an appropriate position downstream of the throttle valve 16 and is provided near its far end with a manifold absolute pressure sensor 30 which detects the absolute value of the manifold pressure. A coolant temperature sensor 32 is provided in the vicinity of the coolant passage 34 of the engine 10 for detecting the temperature of the engine coolant. And a throttle position sensor 36 is provided in the proximity of the throttle valve 16 for detecting the degree of the opening of the throttle valve 16 and a manifold air temperature sensor 38 is provided in the air intake path 12 for detecting the temperature of the air drawn into the engine 10.

The engine 10 has a distributor 40 which includes a crankshaft sensor 42 which outputs a pulse signal once every predetermined angle of crankshaft rotation. And, at an appropriate location, the block of the engine 10 is provided with a piezoelectric knock sensor 44 for detecting vibration produced by combustion knock arising within the combustion chamber 22.

In addition, wheel speed sensors 46, 48 are provided in the proximity of individual driven wheels and non-driven wheels (neither shown) of the vehicle on which the engine 10 is mounted to generate a pulse signal once every wheel rotation. Only one pair of sensors are illustrated in the figure.

The outputs of the sensors are forwarded to a control unit 50.

Figure 2:
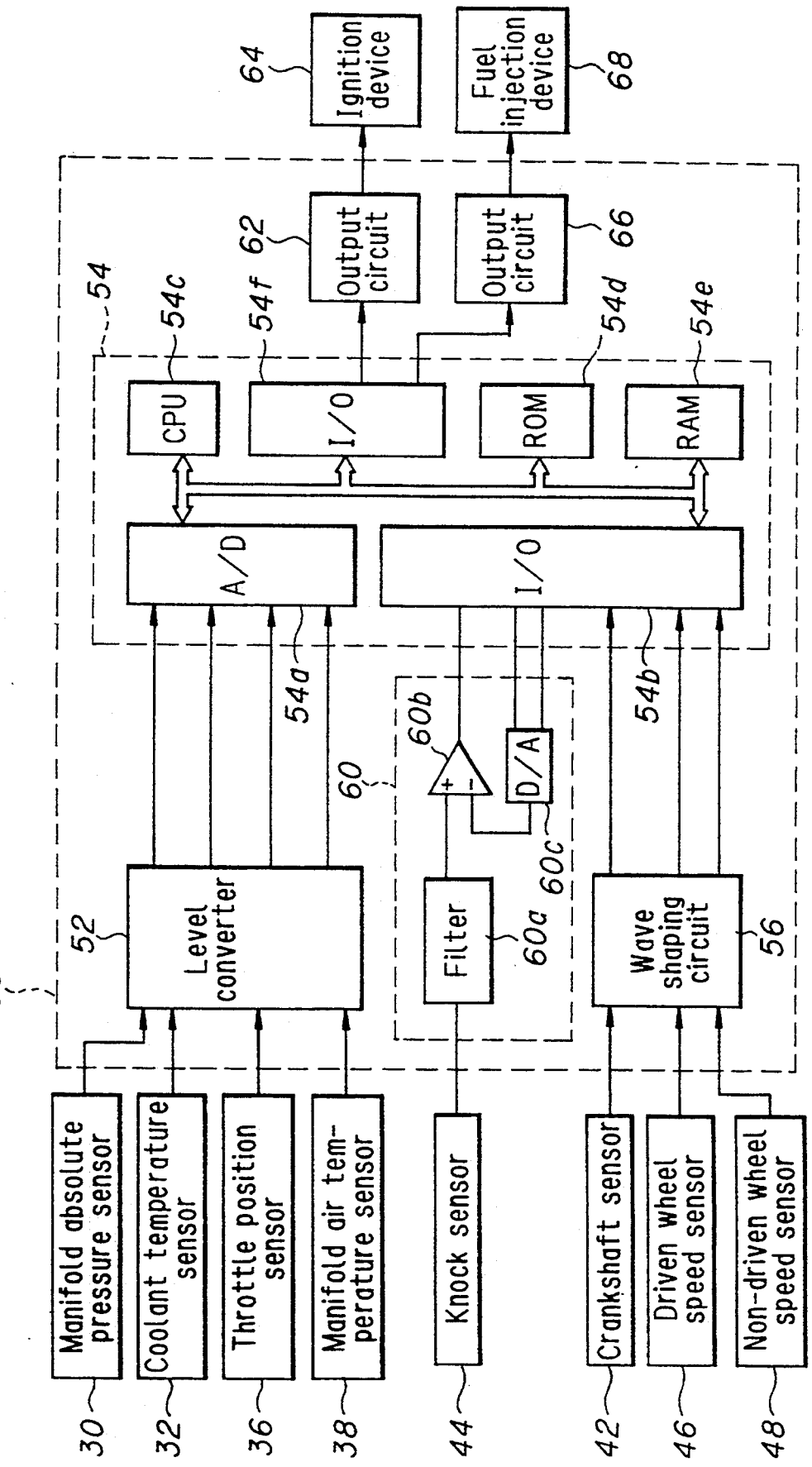
FIG. 2 is a block diagram showing the details of a control unit shown in FIG. 1.

The arrangement of the control unit 50 is illustrated in FIG. 2. The outputs from the manifold absolute pressure sensor 30 and the like are input to a level converter 52 in the control unit 50 for adjustment to a prescribed level and are then forwarded to a microcomputer 54. The microcomputer 54 comprises an A/D converter 54a, I/O circuits 54b, 54f, a CPU (central processing unit) 54c, a ROM (read-only memory) 54d, a RAM (random access memory) 54e, counters for computation and timers (the two last mentioned members are not shown). The signals output by the level converter 52 are converted to digital values by the A/D converter 54a in accordance with commands from the CPU 54c and are then temporarily stored in the RAM 54e. The outputs of the crankshaft sensor 42 and the like are shaped in a wave shaping circuit 56 and then input to the microcomputer 54 through the I/O circuit 54b.

Figure 3:
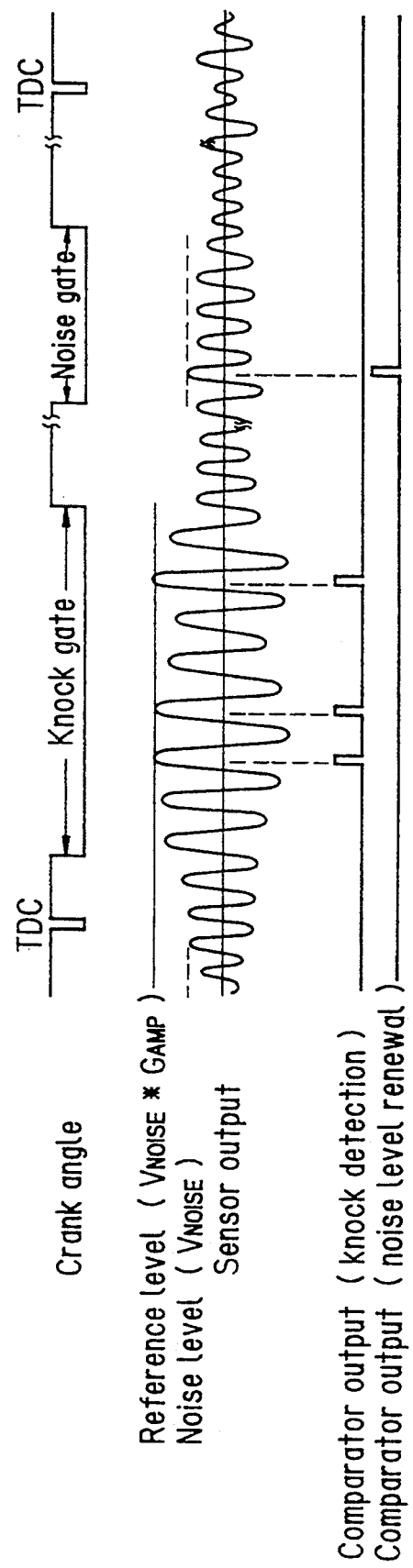
FIG. 3 is a timing chart showing the operation of the knock detection circuit in FIG. 2.

After being sent to the control unit 50, the output from the knock sensor 44 is input to a knock detection circuit 60. The knock detection circuit 60 comprises a filter 60a, a comparator 60b and a D/A converter 60c. The occurrence of combustion knock is detected in the comparator 60b by comparing a reference value received from the microcomputer 54 through the D/A converter 60c with the sensor output value received through the filter 60a. As shown more specifically in FIG. 3, the sensor output value is peak-held in a range of crank angles located in a region free from combustion and referred to as the "noise gate". The peak-held value referred to as "noise level (VNOISE)" in the figure corresponds to mechanical vibration of the engine. The noise level detected is then amplified in the microcomputer 54 by GAMP to obtain the aforesaid reference value, which is then sent, through the D/A converter 60c, to the comparator 60b as mentioned earlier and is compared with the sensor output value in a crank angle range during which combustion arises referred to as the "knock gate". Every time the sensor output value at the knock gate exceeds the reference value, the comparator 60b produces a pulse as shown at the bottom of the figure. By counting the number of pulse(s) and comparing them with a reference value, it is possible to detect if combustion knock occurs.

The CPU 54c in the microcomputer 54 calculates the engine speed by counting the pulse signal of the crankshaft sensor 42 and based on this value and other operating conditions and the presence/absence of combustion knock, it determines the ignition timing as will be explained later and issues an ignition command via the I/O circuit 54f and an output circuit 62 to an ignition device 64, thereby causing the spark plug 24 of a prescribed cylinder selected by the distributor 40 to fire and ignite the air-fuel mixture in the associated chamber 22. It also carries out the traction control in a manner discussed later.

The operation of the control system will now be explained.

Figure 4:
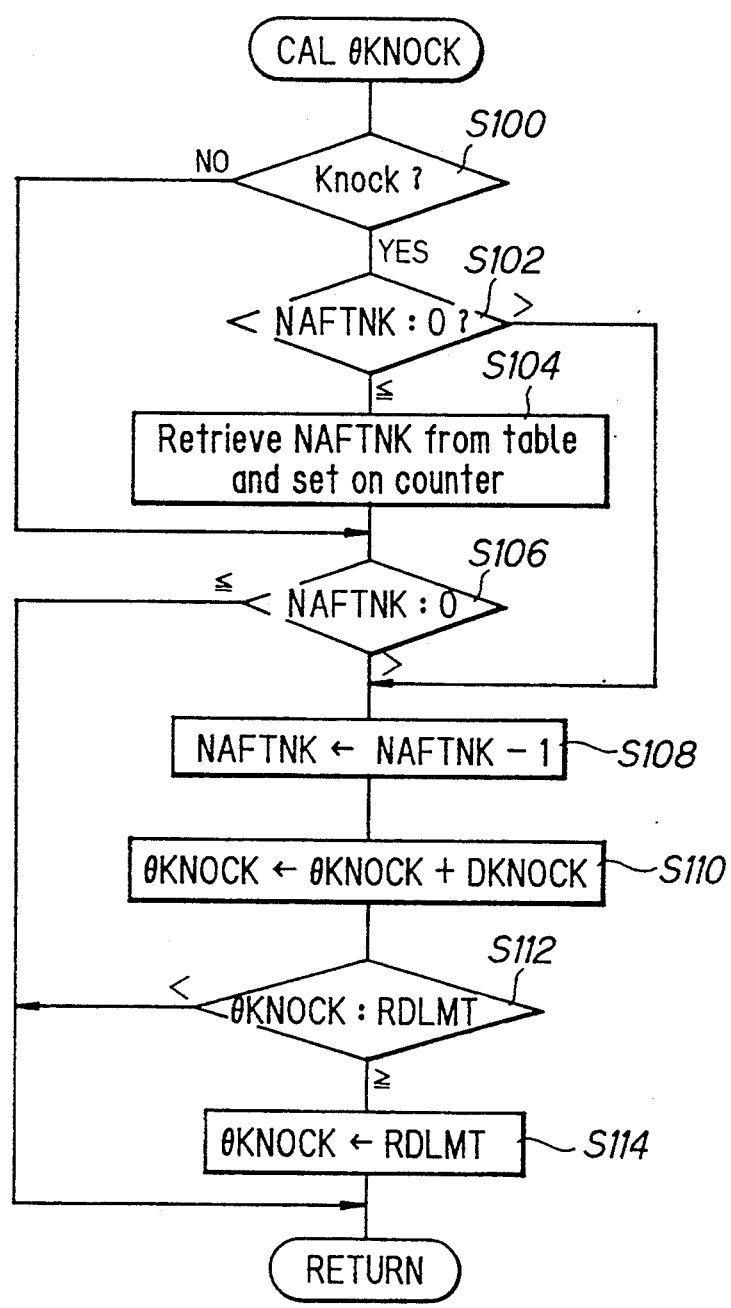
FIG. 4 is a flow chart showing the calculation of a knock adjustment value in the retard direction according to the knock control of the invention.

First, a knock control according to the invention will be explained with reference to the flow chart of FIG. 4. The flow chart shows how a knock adjustment value is calculated in the retard direction.

Figure 5:
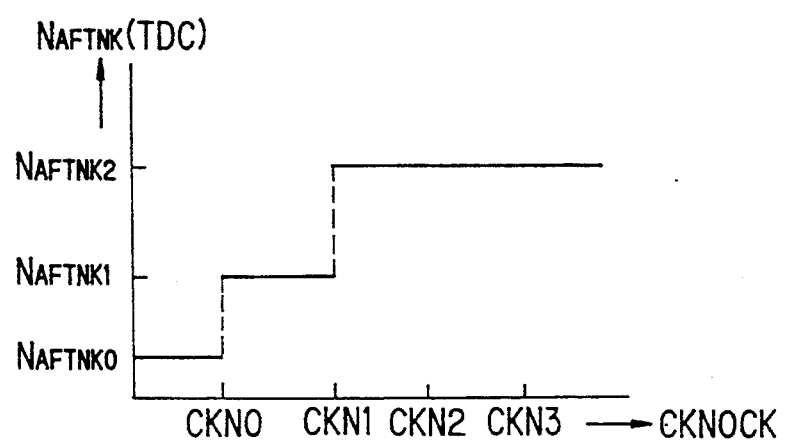
FIG. 5 is a diagram showing the characteristics of a value of a firing number to be consecutively retarded and to be set to a counter referred to in the flow chart in FIG. 4.

The procedure begins with step S100 in which it is checked, from the aforesaid comparator's output pulse(s) if combustion knock occurs. When combustion knock is found to be present, control passes to step S102 in which it is checked if a counter value NAFTNK (explained later) remains. As in the first program cycle this value is in its initial zero state, the result of the checking is negative so that control moves to step S104 in which the value NAFTNK is retrieved from a look-up table, the characteristics of which are shown in FIG. 5, and is set on the counter. This value indicates the number of firings during which retard adjustment is consecutively carried out. As will be noted in this figure, toward the TDC position, this number increases stepwise in proportion as a knock occurrence rate counter value CKNOCK increases.

Control then advances to step S106 in which it is checked if the consecutive retard firing number NAFTNK is zero. If not, control advances to step S108 in which this number is decremented by one, to step S110 in which a unit retard amount DKNOCK, a fixed value, is added to the knock adjustment value $\theta$KNOCK to adjust it in the retard direction, to step S112 in which it is checked if the adjusted retard target value exceeds the value of a maximum retard value RDLMT, and if it does, to step S114 in which the knock adjustment value is replaced by the maximum retard value. This replacement is conducted to prevent the exhaust gas temperature from rising excessively.

Figure 6:
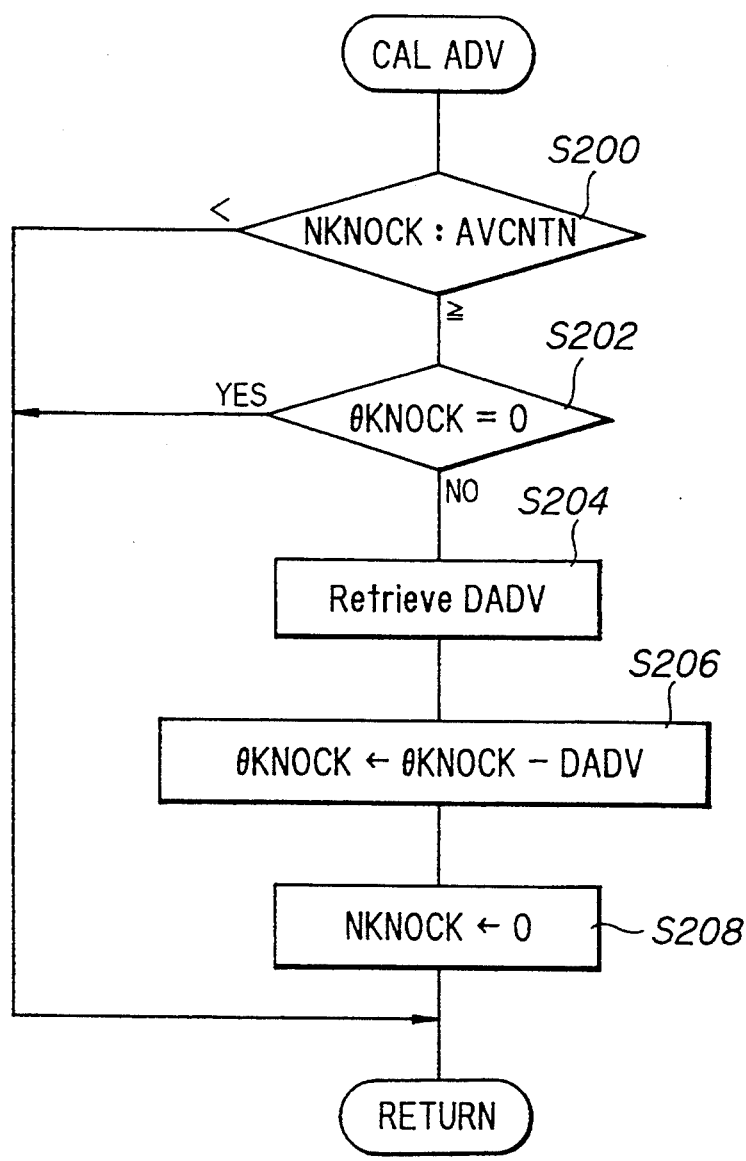
FIG. 6 is a flow chart showing correction of the knock adjustment value of the flow chart in FIG. 4 in the advance direction.

Next, the ignition timing control after combustion knock has ceased will be explained with reference to the flow chart of FIG. 6.

The procedure according to the flow chart of the figure starts with step S200 in which it is checked if a consecutively knock free firing number counter value NKNOCK exceeds a prescribed firing number AVCNTN. The value AVCNTN is the number of firings during which advance should be deferred. When it is found in step S200 that no knock occurred during the prescribed number of firings, after having confirmed at step S202 that the knock adjustment value is not zero, control advances to step S204 in which a unit advance amount DADV, set as a function of the engine speed and the engine load, is retrieved from a look-up table(s) stored in the ROM 54d. Control next goes to step S206 in which the knock adjustment value is reduced by the amount of the retrieved unit advance amount to adjust it in the advance direction, and to step S208 in which the consecutive knock-free firing number counter is reset to zero, concluding the program.

The so-obtained knock adjustment value is added to the basic ignition timing and the final ignition timing is determined by further addition of other adjustment values such as that for the temperature of the engine coolant. However, as these operations are known to the art and have no bearing on the gist of the present invention, they will not be discussed further here.

Figure 7:
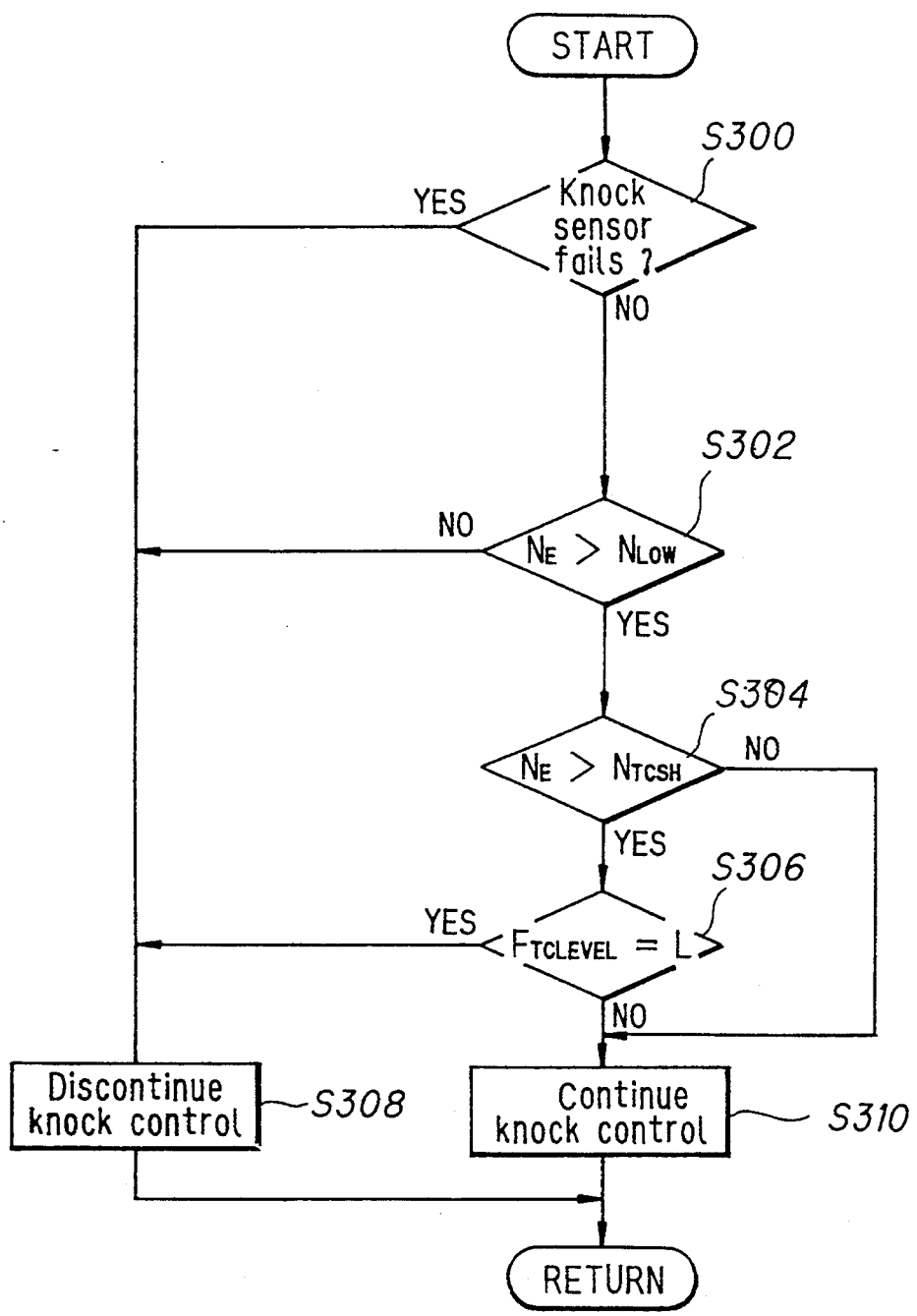
FIG. 7 is a flow chart showing the characteristic feature of the invention.

Next, the characteristic feature of this invention will be explained with reference to the flow chart of FIG. 7.

The program begins with step S300 in which it is checked, by retrieving a flag, not shown, if the knock sensor 44 fails and if not, control passes to step S302 in which the detected engine speed NE is compared with a reference value NLOW, say 600 rpm. If it is found in step S302 that the engine speed NE exceeds the reference value NLOW, control advances to step S304 in which the detected engine speed NE is again compared with a second reference value NTCSH. The second reference value NTCSH is a value indicating the high engine speed region in which the exhaust gas temperature rise becomes a particular problem as earlier mentioned. The second reference value may be, for example, 4,000 to 5,000 rpm.

When the engine speed NE is found, in step S304, to exceed the second reference value NTCSH, control passes to step S306 where, by referring to the kind of flags FTCLEVEL, each indicating the different operation levels of the traction control, it is checked if the traction control is being conducted by leaning out the air-fuel mixture. The fuel leaning out control is indicated by a flag "L" (=FTCLEVEL).

Figure 8:
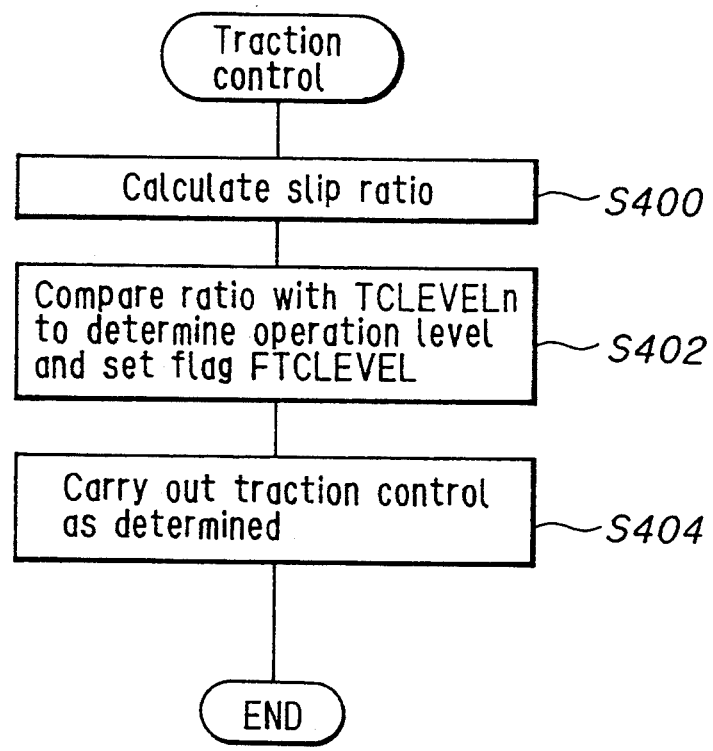
FIG. 8 is a flow chart showing the traction control according to the invention.

For understanding this, the traction control of the invention will be explained here with reference to the flow chart in FIG. 8.

In the first step S400, the CPU 54c in the microcomputer detects the driven wheel speed(s) and the non-driven wheel speed(s) for the individual wheels by counting the output signal of the wheel speed sensors 46, 48 and calculates a slip ratio as follows:

$$\text{slip ratio} = \frac{\text{driven wheel speed} - \text{non-driven wheel speed}}{\text{non-driven wheel speed}}$$

Figure 9:
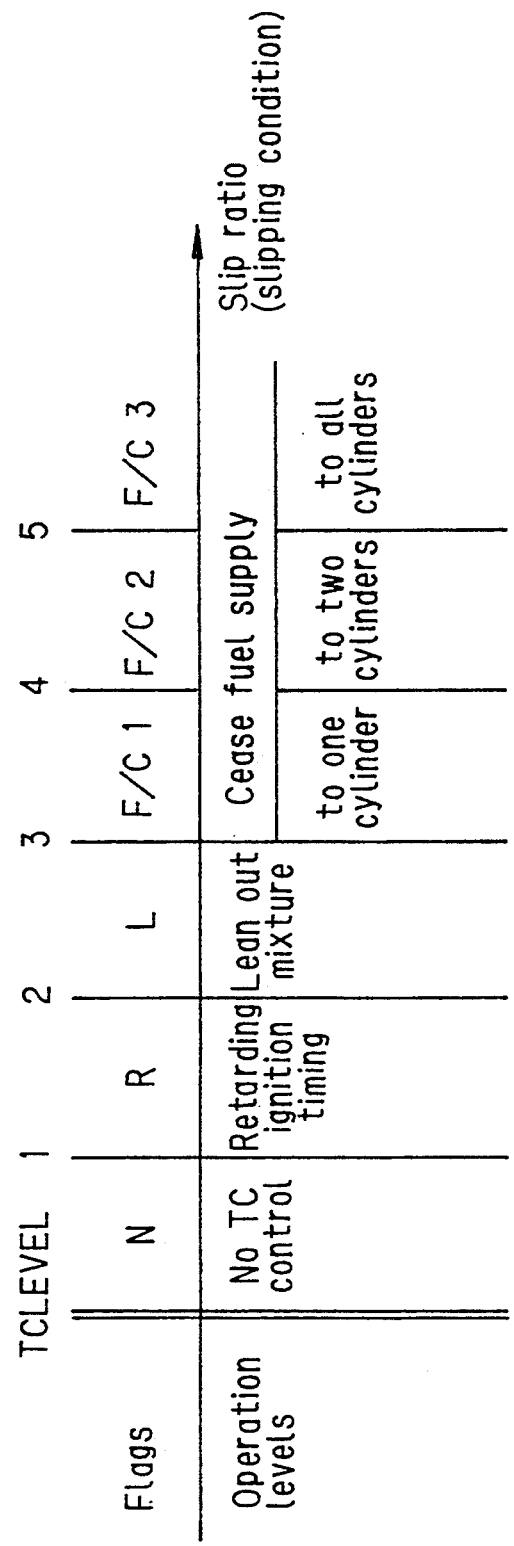
FIG. 9 is an explanatory view showing the traction control level referred to in the flow charts in FIG. 7 and FIG. 8.

Control then moves to step S402 in which the calculated slip ratio is compared with reference values TCLEVEL 1 TO TCLEVEL 5, illustrated in FIG. 9, to select one among the operation levels also illustrated in the figure corresponding thereto. For example, if the calculated slip ratio is below TCLEVEL 1, no traction control will be carried out. Alternatively, if the calculated ratio exceeds TCLEVEL 1, but is less than TCLEVEL 2, the driven wheel's slippage condition is not to the extent that the engine output torque will be reduced by the ignition timing retard control. Also in this step, in response to the selected level, the flag FTCLEVEL corresponding thereto is set. For example, if the level TCLEVEL 3 is selected, the air-fuel mixture will be leaned out such as to be 17.0:1 and the flag FTCLEVEL will be set as "L". Control then advances to the final step S404, in which the selected operation is carried out. If the operation should be carried out in the terms of the fuel supply, the CPU 54c will determine and send a control value to an fuel injection device 68 through the I/O circuit 54f and a second output circuit 66.

Again returning to FIG. 7, it is thus checked at step S306 if the flag FTCLEVEL is set as "L". If it is, control advances to step S308 in which the knock control is discontinued. This is done by prohibiting counting the aforesaid comparator's output pulse(s) etc. and if the knock pulse adjustment value θKNOCK remains, the θKNOCK will forcibly be reset to zero. On the other hand, however, if the flag being set is found not to be "L", control passes to step S310 in which the knock control is continued.

Incidentally, if the engine speed NE is found, at step S304, to be below the second reference value, control skips over step S306, since the exhaust gas temperature rise will not be the problem at relatively low engine speeds even if the traction control and the knock control are carried out concurrently. Moreover, if the engine speed NE is found, at step S302, to be below the first reference value NLOW, i.e., if the engine speed is found to be quite low, control also passes to step S308 to discontinue the knock control, since combustion knock may not occur at such a low speed region and even if it occurs, the retard adjustment might cause misfiring of the spark plug 24. The discontinuation of the knock control will also be applied when the knock sensor is found to fail at the first step.

With the arrangement, the knock control is discontinued when the fuel is leaned out in the high engine speed region to prevent the exhaust gas temperature from rising excessively, thereby preventing a catalyst installed in the exhaust system from being degraded and exhaust emission from being affected. It should be noted here that, since combustion energy becomes less when the mixture is leaned out than in a case where the stoichiometric fuel is supplied, combustion knock, if it occurs, will be harmless and will not damage the engine.

Figure 10:
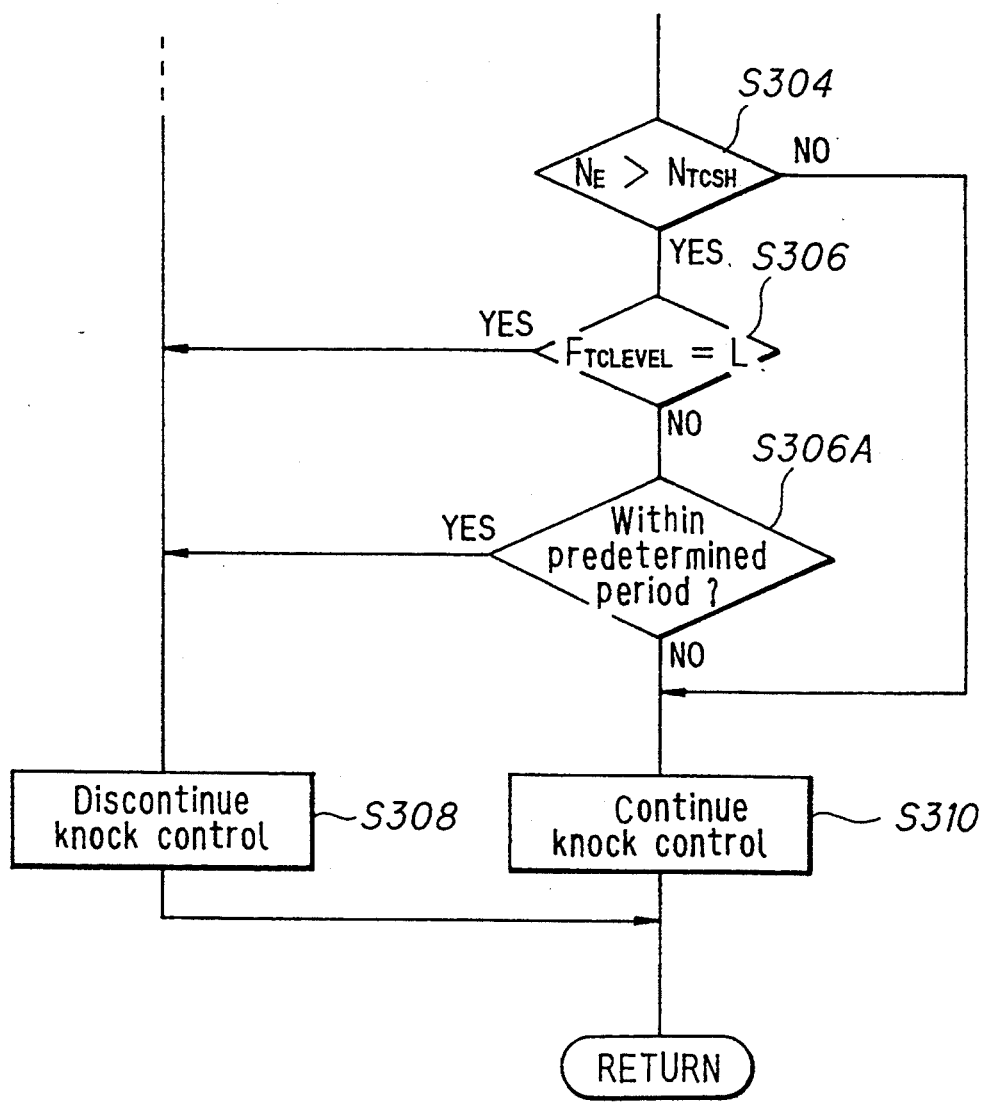
FIG. 10 is a partial flow chart, similar to FIG. 7, but showing the second embodiment of the invention.

FIG. 10 is a flow chart showing the second embodiment of this invention.

Focussing on the difference from the first embodiment, after passing through to step S304, control moves to step S306 in which it is checked if the flag "L" is set, and if so, to step S308 to discontinue the knock control as was experienced in the first embodiment. If not, control passes to step S306A in which it is checked if a predetermined period has expired. The predetermined period is counted from the time at which the flag "L", once set, was changed to the others. If it is found to be within the predetermined period, control passes to step S308 to keep the discontinuation of the knock control, while to step S310 to continue knock control if the predetermined period has found to have expired.

Thus, if the flag was once set to be "L", the knock control will be suspended until the predetermined period has lapsed since the flag was then changed to the others. Therefore, by determining the period appropriately, even if the driven wheel continues to slip further and the operation is leveled up to the fuel cut, the knock control may be suspended until the exhaust gas temperature has sufficiently dropped to a safe value. The exhaust gas temperature's excessive rise will therefore be avoided more effectively.

In the embodiments, although the knock control is discontinued after checking the engine speed, it may alternatively discontinue the knock control immediately when the fuel is leaned out in the traction control.

The present invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling combustion knock occurring in an internal combustion engine, comprising:
   a knock sensor;

a first means for detecting combustion knock in response to an output signal of said knock sensor;

second means for carrying out knock control by adjusting ignition timing of the engine in a retard direction when combustion knock is detected to occur;

third means for detecting a slipping condition of a driven wheel of a vehicle on which the engine is mounted;

fourth means for carrying out a traction control to reduce engine output torque in response to the detected slipping condition of said driven wheel at least through a supply of fuel to the engine; and fifth means for discriminating if said traction control is in process;

wherein said second means discontinues said knock control if said traction control is found to be in process and wherein said fourth means carries out said traction control by leaning out a mixture to be supplied to the engine.

2. A system according to claim 1, further including:
sixth means for detecting an engine speed; and
said second means discontinues said knock control if engine speed is found to be greater than a first predetermined speed when said traction control is in process.

3. A system according to claim 2, wherein said first predetermined speed is a high engine speed.

4. A system according to claim 2, wherein said second means discontinues said knock control if said engine speed is found to be greater than a second predetermined speed when said traction control is in process.

5. A system according to claim 4, wherein said second predetermined speed is an engine speed which is lower than said first predetermined speed.

6. A system according to claim 1, wherein said third means detects the slipping condition by calculating a ratio between driven wheel speed and a non-driven wheel speed of the vehicle.

7. A system according to claim 6, wherein said fourth means compares the calculated ratio with a reference value and carries out said traction control to lean out said mixture if said calculated ratio is found to exceed said reference value.

8. A system according to claim 1, wherein said second means discontinues said knock control and cancels a knock correction amount, if said knock correction amount is present, when said traction control is found to be in process.

9. A system, for controlling combustion knock occurring in an internal combustion engine, comprising:
a knock sensor;
a first means for detecting combustion knock in response to an output signal of said knock sensor;
second means for carrying out knock control by adjusting ignition timing of the engine in a retard direction when combustion knock is detected to occur;
third means for detecting a slipping condition of a driven wheel of a vehicle on which the engine is mounted;
fourth means for carrying out a traction control to reduce engine output torque in response to the detected slipping condition of said driven wheel at least through a supply of fuel to the engine; and
fifth means for discriminating if said traction control is in process;
wherein said second means discontinues said knock control if said traction control is found to be in process; and
wherein said second means suspends the knock control for a predetermined period after the traction control has ceased.

10. A system for controlling combustion knock occurring in an internal combustion engine, comprising:
a knock sensor;
first means for detecting combustion knock in response to an output signal of said knock sensor;
second means for detecting engine speed;
third means for carrying out knock control by adjusting ignition timing of the engine in a retard direction when combustion knock is detected to occur;
fourth means for detecting a slipping condition of a driven wheel of a vehicle on which the engine is mounted;
fifth means for carrying out a traction control to reduce engine output torque in response to the detected slipping condition of said driven wheel by leaning out a mixture to be supplied to the engine; and
sixth means for discriminating if said traction control is in process;
wherein said third means compares the detected engine speed with a predetermined speed, and discontinues said knock control only if said detected engine speed is found to exceed said predetermined speed when said traction control is found to be in process.

* * * * *